United States Patent

[11] 3,555,221

| | | |
|---|---|---|
| [72] | Inventor | Jack J. Booth<br>P.O. Box 10872, Dallas, Tex. 75207 |
| [21] | Appl. No. | 767,206 |
| [22] | Filed | Oct. 14, 1968 |
| [45] | Patented | Jan. 12, 1971 |

[54] PURGING LIQUID SUPPLY SENSOR
5 Claims, 4 Drawing Figs.

[52] U.S. Cl................................................ 200/84,
200/81; 335/205
[51] Int. Cl........................................................ H01h 35/18
[50] Field of Search............................................ 200/84.3,
81.9; 335/205—207

[56]           References Cited
          UNITED STATES PATENTS

| | | | |
|---|---|---|---|
| 2,791,657 | 5/1957 | Bloxsom et al. | 200/84.3(ux) |
| 2,963,563 | 12/1960 | Patterson | 200/81.9(ux) |
| 3,163,731 | 12/1964 | Lyden | 200/84.3(ux) |
| 3,327,079 | 6/1967 | Widl | 335/217X |

*Primary Examiner*—Robert K. Schaefer
*Assistant Examiner*—D. Smith, Jr.
*Attorney*—Richards, Harris and Hubbard ABSTRACT: A float including a magnet is mounted in a chamber for vertical travel in a liquid body, with a control switch adjacent the path of travel of the magnet for opening and closing of the switch in response to liquid level. A liquid inlet path leads to the bottom of the float chamber and an outlet path leads from the top of the chamber, with a bleedoff path extending between the bottom of the chamber and the outlet path and of small flow capacity relative to the inlet and outlet paths.

PATENTED JAN 12 1971

3,555,221

INVENTOR
JACK J. BOOTH

Richards, Harris & Hubbard

ATTORNEY

PURGING LIQUID SUPPLY SENSOR

This invention relates to sensing of a supply of liquid used in a process, and more particularly to provision of a control function actuated in response to the position of a sensing float and of such character that it is self-purging.

In the production and dispensing of carbonated beverages, and particularly those characterized as slushy carbonated beverages, provisions have been made for automatically disabling a dispensing system in the event the supply of syrup, for example, is exhausted. Such a provision is described in applicant's copending patent application Ser. No. 649,541, filed June 28, 1967, now U.S. Pat. No. 3,400,551.

The present invention is directed to an improved self-purging liquid supply sensor which may be installed in the supply line leading to the liquid-dispensing unit. Prior devices have been heretofore developed, but have suffered the limitation that it is necessary to purge the sensor unit each time the supply of liquid to be sensed is exhausted in order to assure proper operation after the supply has been replenished. The present invention provides a simplified and yet positively accurate liquid supply sensor for use in the control of a beverage-dispensing machine.

In accordance with the invention, structure is provided in which there is a vertical bore extending above a base portion. An inlet channel leads to the bottom of the bore for flow of liquid thereto and an outlet channel leads from the top of the bore for flow of liquid therefrom. A bleedoff channel extends between the bottom of the bore and the outlet channel with the bleedoff channel being of flow capacity which is small compared with the capacities of the inlet and outlet channels. A float having a permanent magnet is axially movable in the bore in response to the presence of liquid therein. A switch mounted adjacent the bore within the structure is responsive to a change in the location of the magnet to alter the state of the switch. In a preferred embodiment when the liquid floats the magnet upward, the switch is closed thereby energizing the dispensing system. When the supply of liquid is exhausted, the float is floated downwardly and the switch opens to disable the dispensing system.

For a more complete understanding of the present invention and for further objects and advantages thereof, reference may now be had to the following description taken in conjunction with the accompanying drawings in which.

Figure 1:
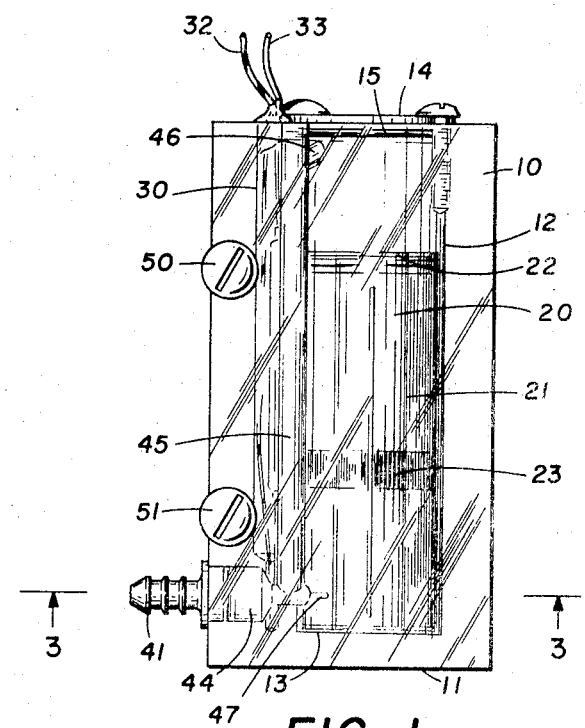
FIG. 1 is a side view of an embodiment of the invention.
Figure 4:
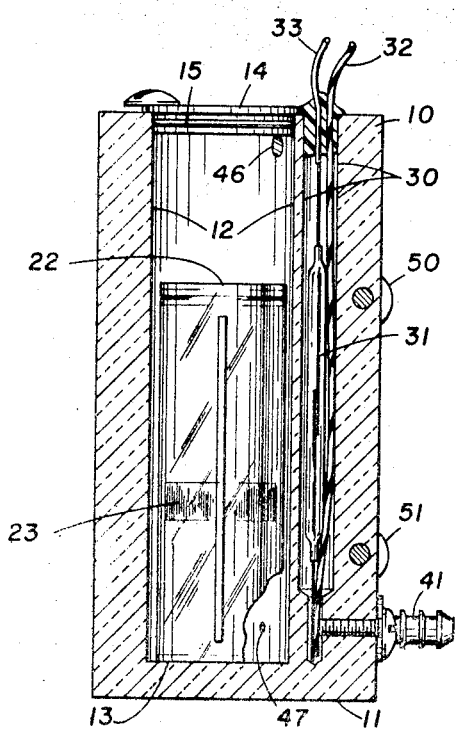
FIG. 4 is a sectional view taken along lines 4–4 of FIG. 2.

Referring now to FIGS. 1 and 4, there is illustrated a block 10 of clear plastic which is normally employed in a vertical position extending above the base 11. A vertical bore 12 extends through block 10 and includes a bottom 13 and a closure cap 14 sealed therein by an O-ring 15. A float 20 is mounted for free travel within the bore 12. The float 20 is substantially shorter than the bore 12 so that the float can move up and down in the bore in response to presence or absence of liquid in the bore. The float 20 comprises a thin walled plastic tube 21 having a cap 22 and a magnet 23 disposed therein.

A second vertical bore 30 extends parallel to the bore 20 and is spaced slightly therefrom. A reed relay 31 or any other suitable magnetic switch, is mounted in the bore 30 and is positioned so that the relay contacts will be opened when the magnet is in its lowest position, and so that the relay contacts will be closed due to magnetic attraction when the magnet 23 carried by float 20 is in its upper position. Wires 32 and 33 connect the reed relay 31 to a control or warning system (not shown).

Figure 2:
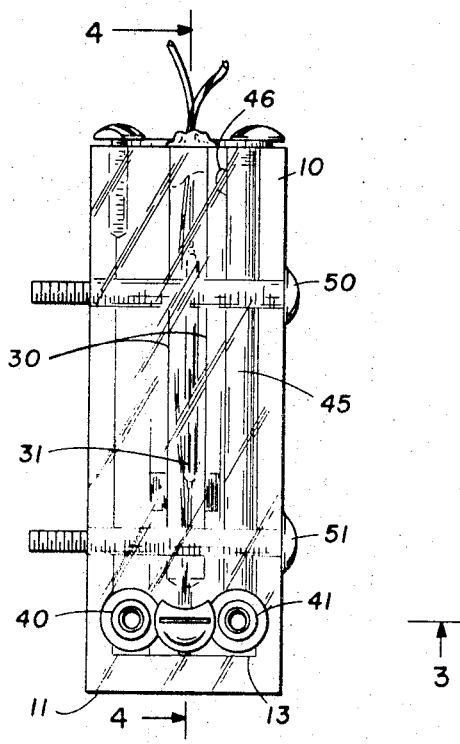
FIG. 2 is a front view of the unit of FIG. 1.
Figure 3:
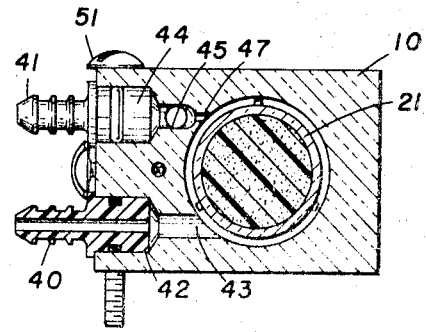
FIG. 3 is a sectional view taken along lines 3–3 of FIG. 1.

As best shown in FIGS. 2 and 3, an inlet fitting 40 is mounted in the lower left-hand portion of the front of the structure and an outlet fitting 41 in the lower right-hand portion of the structure. The fitting 40 is mounted in a well 42 with a flow channel 43 extending into the bore 12 near the bottom of the bore 12.

As indicated in FIGS. 1 and 3, the fitting 41 is mounted in a well 44 and communicates with a vertically extending bore 45. The bore 45 is connected by way of a slanting bore 46 to the float chamber 12 near the upper end of the chamber 12.

It will also be noted that a bleedoff channel 47 leads from the well 44 into the bottom of the float chamber 12. The bleedoff channel 47 has very low flow capacity compared with the flow capacity of the channels 43, 45 and 46, and the fittings 40 and 41.

By reason of the provision of the bleedoff channel 47, the system will be self-purging and yet will be positively operating in control of the position of the float 20. In operation, when flow of fluid is initiated through fitting 40 and well 42, the liquid level rises in the chamber 12, thereby elevating the float 20 and its magnet 23 to close the circuit through the relay 31. Because of the low capacity of the channel 47, the liquid flow of any quantity must pass out of the bore 12 through channel 46, channel 45 and fitting 41.

When the supply of liquid for the system is exhausted, the liquid may drain from the bore 12 through the channel 47, thereby assuring that upon replenishment of the liquid supply, the float chamber 12 will be completely purged of air by reason of the flow into the chamber 12 at the bottom and from the chamber 12 at the top.

The sensor above described may find use in many different specific systems. However, by way of example, it would be used by insertion thereof in the fluid line 39 of the Booth U.S. Pat. No. 3,359,748 and would function to disable the system from dispensing any beverage until the supply is replenished. The disabling could be carried out either through the actuation or deactuation of a warning or signaling system or to provide a latch on valve 20a of said patent.

It would be noted that mounting screws 50 and 51 extend through horizontal bores to provide for suitably mounting the sensor at a convenient location on the system with which it is associated.

Having described the invention in connection with certain specific embodiments thereof, it is to be understood that further modifications may now suggest themselves to those skilled in the art and it is intended to cover such modifications as fall within the scope of the appended claims.

I claim:

1. A self-purging liquid supply sensor which comprises:
   a. structure having a base portion and a vertical bore therein with an inlet channel leading to the bottom of said base for flow of liquid thereto, and an outlet channel leading from the top of said bore for flow of liquid therefrom and a bleedoff channel extending between the bottom of said bore and said outlet channel and being of flow capacity which is small compared with the capacities of said inlet and outlet channels such that primary liquid flow is through said vertical bore and said outlet channel, said bleedoff channel acting to drain off accumulated liquid within said vertical bore when the flow of liquid is terminated;
   b. a float having a permanent magnet which moves axially in liquid in said vertical bore; and
   c. a switch mounted adjacent to said vertical bore and responsive to a change in location of said magnet to alter the state of said switch.

2. The liquid supply sensor of claim 1, wherein said outlet channel extends from the top of said bore downwardly parallel to said bore to a region adjacent the bottom of said base, said bleedoff channel extending from the bottom of said bore and the lowermost part of said outlet channel.

3. The liquid supply sensor of claim 2 wherein said bleedoff channel extends horizontally for a relatively short length between said bore and said outlet channel.

4. The liquid supply sensor of claim 2 wherein said switch comprises a reed relay switch movable between open and closed positions in response to a varying magnetic field.

5. The liquid supply sensor of claim 2 wherein said float comprises a cylindrical casing with said magnet mounted in the center region thereof.